June 14, 1949.  H. GANG  2,473,422
TENS CARRY MECHANISM FOR CALCULATING MACHINES
Filed Nov. 27, 1946  3 Sheets-Sheet 1

Inventor
Herman Gang
By E.W. Anderson & Son
Attorney

June 14, 1949. H. GANG 2,473,422
TENS CARRY MECHANISM FOR CALCULATING MACHINES
Filed Nov. 27, 1946 3 Sheets-Sheet 3
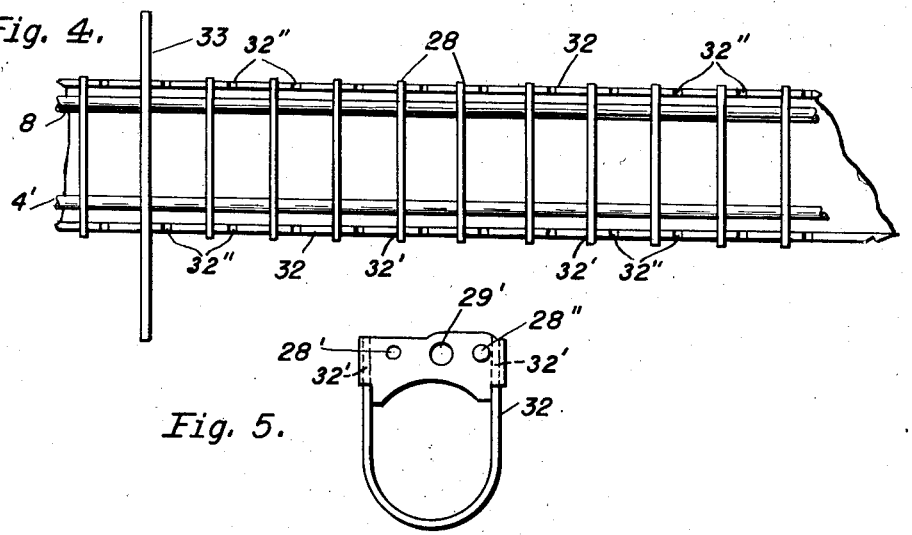
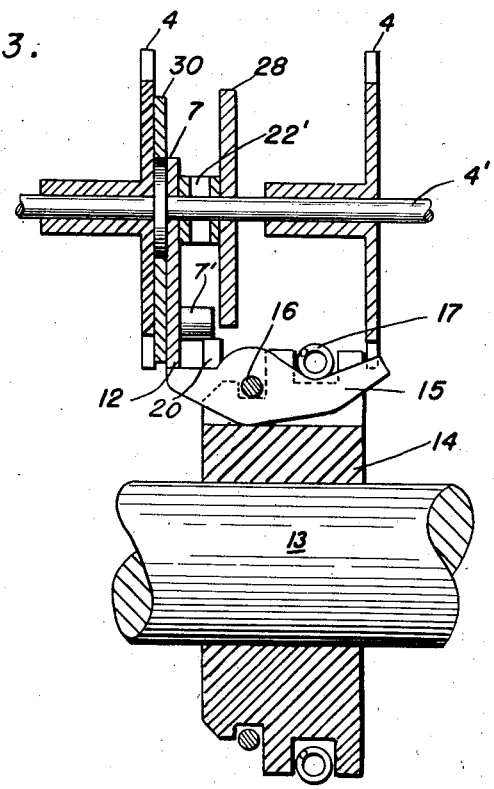
Inventor
Herman Gang
E.W. Anderson & Son
Attorney Patented June 14, 1949

2,473,422

UNITED STATES PATENT OFFICE 2,473,422

TENS CARRY MECHANISM FOR CALCULATING MACHINES

Herman Gang, Livingston, N. J., assignor to Monroe Calculating Machine Company, Orange, N. J., a corporation of Delaware Application November 27, 1946, Serial No. 712,557

1 Claim. (Cl. 235—133)

The invention relates to tens carry mechanism for calculating machines, such as disclosed in the patent to Walter, No. 2,089,820, dated August 10, 1937, an object of the invention being to provide certain improvements upon the spring means for yieldably maintaining the settable members of the patent in and assisting in the movement thereof to set and to restored position and for limiting the movement thereof in both directions, whereby assembly and installation are facilitated, the settable members are more securely yieldably maintained in set and in restored position, manufacturing costs are reduced and friction of the working parts is reduced.

The invention consists in the novel construction and combinations of parts as hereinafter set forth in the claim.

In the accompanying drawing,

Figure 3 is a fragmentary section on the line 3—3, Figure 1.

Figure 4 is a detail plan view of a portion of the cage inclosure, showing the transverse brace plates, the intermediate gear shaft, and the carry shaft.

Figure 5 is a detail end view of the cage inclosure, showing a transverse brace plate and the apertures thereof for the carry shaft, the intermediate gear shaft and the overthrow check spring.

Figure 1:
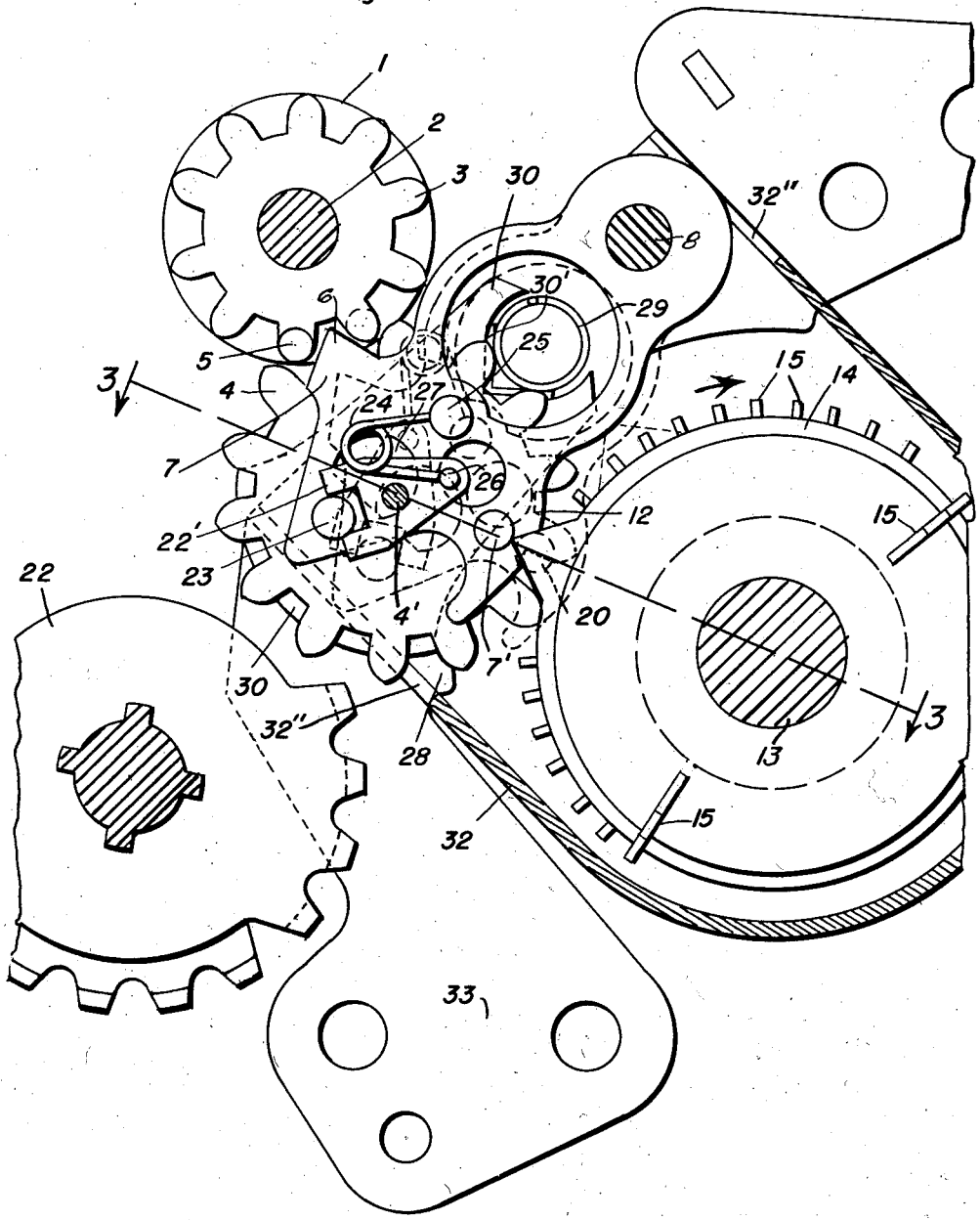
Figure 1 is a vertical sectional enlarged view taken through the carry mechanism and associated parts, shown in normal position of rest, with the carry elements restored to inactive position, the positions of the parts assumed in transferring a unit to a higher order numeral wheel being shown in dotted lines.
Figure 2:
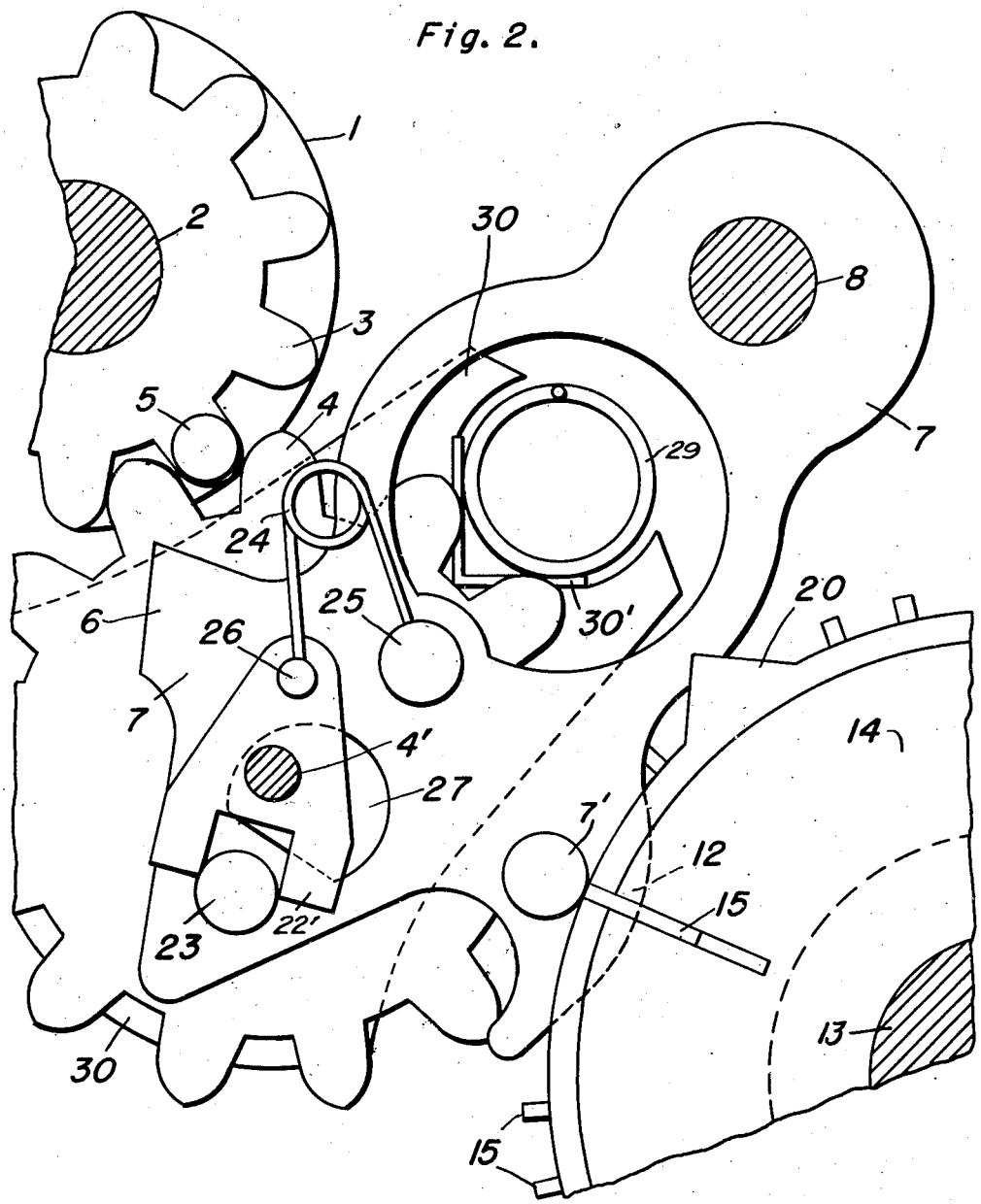
Figure 2 is a further enlarged view similar to Figure 1 but omitting certain of the parts, the parts shown being in the positions assumed in transferring a unit to a higher order numeral wheel.

In the drawing, the invention is shown as applied to a Monroe machine as stated in the aforesaid patent to Walter, which is made part of the disclosure in this case.

In this drawing, the numeral 1 designates a numeral wheel mounted upon shaft 2, and having fast thereto a pinion 3, adapted to mesh with an intermediate gear 4, which gear is operated by the differentially set acuators 22 and the tens carry mechanism. Each wheel 3 is provided with a projection 5 lying in the plane of a tooth 6 of a settable carry member 7, pivoted upon a supporting shaft 8, and provided with means including a spring for yieldably maintaining it in and assisting in the movement thereof to either of its two positions, with the tooth 6 in the path of movement of the projection 5, or upon displacement of the member 7 by projection 5, to maintain an oppositely beveled part 12 of member 7 in depressed position. There is provided a settable member 7 related to each active numeral wheel 1 of the machine.

Upon the drive or carry shaft 13 are splined or otherwise made fast a series of circumferentially channeled sleeves 14, each sleeve being provided with two radial notches in which are mounted two pivotal dogs 15 extending longitudinally of the shaft 13, one of said dogs acting to transmit the carry to the next higher numeral wheel in additive operations and the other in subtractive operations. Preferably each pair of dogs 15 is secured upon the related sleeve 14 by an annular wire 16 clipped into a narrow channel of the sleeve and passing through a perforation located intermediately of the length of the dogs 15. An annular coiled spring 17 is seated in a second channel of the sleeve and engages arms of the dogs to hold the opposite arms thereof normally in inactive position. These dogs are of lever character, having their fulcrums upon the annular wire 16.

In the transmission of the tens carry, a numeral wheel 1 will through its projection 5 engage a tooth 6 of the related settable member 7 and depress said member into set position wherein a beveled surface of part 12 of said member will be engaged by an arm of the related dog 15 in the rotation of the sleeve 14 to raise the opposite arm of said dog into position to engage between the teeth of the intermediate gear 4 related to the next higher order numeral wheel 1. The dog is held in engaging position while passing through the gear 4 by the part 12 so that one step of movement is imparted to the higher order numeral wheel 1, after which the dog, passing beyond the part 12, will be retracted by its spring 17. A double beveled tooth 20 of sleeve 14 engages pin 7' of member 7 to restore said member to normal set position following the tens carry.

In order to maintain the members 7 yieldably in and to assist in the movement thereof to either of their two positions, each settable member is provided with a U-form rocker lever 22', which is fulcrumed upon the intermediate gear shaft 4' and has one arm thereof engaging a lateral pin 23 of the settable member, a coiled spring 24 of the general form of a hair pin with the coil in the bend thereof, having one end portion anchored to a pin 25 of the settable member located upon the side of the intermediate gear shaft 4' opposite to that upon which the pin 23 is located and its other end portion anchored to the other arm of the rocker lever at 26, said two pins 23 and 25 in the depression and in the restoration of the settable member moving into and past alignment with said shaft in each case to first compress said spring as the parts are aligned and to thereafter permit expansion of said spring to assist in the movement of the member to set and to restored position and to yieldably maintain the member in such position. In the movement of the member to set position the rocker lever and the coiled spring are rocked in unison, the coiled spring being rocked without the U of the lever, and in the restoration of said member, the rocker lever and the coiled spring are reversely rocked in unison and the spring is rocked in part within the U of the lever. Both the rocker lever and the coiled spring are located and move in planes parallel to that of the settable member and of the intermediate gear. The coiled spring is mounted upon and connects the rocker lever and the settable member, to the pins of which its terminals are anchored, as aforesaid.

Each of the settable members 7 is provided with an aperture 27 through which apertures pass the intermediate gear shaft 4', opposite upper and lower edges of an aperture contacting said shaft in the depression and in the restoration of the settable member to positively limit the setting movement in both directions.

In view of the permissible size limitations of the parts employed herein it is necessary to make the intermediate gear shaft 4' quite small in diameter, as otherwise the aperture 27 of the settable member would need to be too large in diameter for the purpose stated. This shaft 4' therefore requires to be transversely braced at intervals throughout its length more than would otherwise be necessary and to this end transverse spaced brace plates 28 are employed in the stationary framing, apertures 28' of said brace plates being engaged by said shaft. These brace plates 28 are provided with another set of apertures 28'' engaged by the pivot shaft 8 of the settable members 7, so that this shaft 8 may be of reduced diameter and weight. The brace plates 28 are provided with still another set of apertures 29' for the overthrow check spring 29, for the same purpose. Interposed between each intermediate gear 4 and its related settable member 7 is a reciprocatory slidable plate 30 constructed and functioning in accord with the disclosure of the patent to Walter, No. 2,101,766, dated December 7, 1937. In the present case these plates 30 are each provided with a laterally offset V-form ridge tooth 30'' acting to displace the portion of the check spring 29 engaged thereby to render said check spring ineffective at times as stated in said patent.

In order to facilitate assembly and to provide for accurate zoning (spacing) of the intermediate gears 4 and other parts of the totalizer units of the machine, a supplemental frame or cage 32 of U-form in cross section is suitably mounted in the stationary framing through the medium of a center plate 33 and end plates (not shown), said transverse brace plates 28 being mounted within notches 32' of the upper free ends of the spaced sides of said cage. Other notches 32'' are also provided in the upper free ends of the spaced sides of said cage wherein both ends of the settable members 7 are located and work. The outer ends of the slidable plates 30 and the adjacent circumferential edge portions of the intermediate gears 4 are also located and work within said notches 32''. The carry shaft 13, the rotary sleeves 14 and the parts carried thereby are located within this cage.

I claim:

In tens carry mechanism for calculating machines having numeral wheels provided with gears, differential actuator gears, movement transmission gears between the differential acuator gears and the numeral wheel gears, a shaft therefor, rotary sleeves having pivotal dogs, pivoted settable members individually depressible to set position by a numeral wheel gear to rock the related dog into mesh with the transmission gear related to the next higher order numeral wheel to thereby during the rotation of the related sleeve transfer the carry to the next higher order numeral wheel, and means for restoring the settable member during further rotation of the related sleeve; means for yieldably maintaining the settable member in and assisting in its movement to set and to restore position, comprising a spring of hair pin form one end of which has pivotal connection with the settable member upon one side of said shaft, a lever fulcrumed intermediately of its length upon said shaft and one arm of which has pivotal connection with said settable member upon the other side of said shaft to rock said lever in opposite directions upon depression and restoration of said settable member and the other arm of which works between said connections and has pivotal connection with the other end of said spring to exert leverage upon and compress said spring and to rock said spring as an entirety in unison therewith until its connection therewith becomes aligned with said connections of said lever and said first named end of said spring with said settable member and to thereafter permit expansion of said spring, said settable member having an aperture through which said shaft passes and opposite edges of which contact said shaft to limit its movement in both directions, said lever and said spring being located and rocking in planes parallel to that of said settable member.

HERMAN GANG.

REFERENCES CITED

The following references are of record in the file of this patent:

UNITED STATES PATENTS

| Number | Name | Date |
| --- | --- | --- |
| 1,334,784 | Newton | Mar. 23, 1920 |
| 1,439,097 | Graham | Dec. 19, 1922 |
| 1,462,058 | Britten, Jr. | July 17, 1923 |
| 2,089,820 | Walter | Aug. 10, 1937 |
| 2,289,137 | Matter | July 7, 1942 |